(12) United States Patent
Müllner et al.

(10) Patent No.: US 12,437,531 B1
(45) Date of Patent: Oct. 7, 2025

(54) AI-BASED AUTOMATED CLASSIFICATION AND DETERMINATION OF MATERIAL PROPERTIES OF OBJECTS

(71) Applicant: e.SIC GmbH, Dornach (DE)

(72) Inventors: Josef Johann Valentin Müllner, Pilsen (CZ); Martin Markert, Erfurt (DE); Sebastian Johannes Brehme, Ilmenau (DE)

(73) Assignee: e.SIC GmbH, Dornach (DE)

( * ) Notice: Subject to any disclaimer, the term of this patent is extended or adjusted under 35 U.S.C. 154(b) by 0 days.

(21) Appl. No.: 18/918,098

(22) Filed: Oct. 17, 2024

(51) Int. Cl.
*G06V 20/10* (2022.01)
*G06V 10/98* (2022.01)

(52) U.S. Cl.
CPC .......... *G06V 10/993* (2022.01); *G06V 20/194* (2022.01)

(58) Field of Classification Search
CPC .......... G06N 3/045; G06N 3/08; G06N 20/00; G06N 3/04; G06N 3/0455; G06N 3/084; F16L 58/1027; F17D 3/01; F17D 5/00; F17D 5/005; F17D 5/02; F17D 5/06; G01F 1/662; G01F 1/666; G01M 3/243; G01M 3/2807; G01N 17/02; G06F 16/55; G06F 18/214; G06F 18/2163; G06F 18/2193; G06F 2113/14; G06F 30/27; G06T 2207/10016; G06T 2207/20081; G06T 2207/20084; G06T 2207/30108;
(Continued)

(56) References Cited

U.S. PATENT DOCUMENTS

| | | | |
|---|---|---|---|
| 11,900,630 B2* | 2/2024 | Zheng | G06T 7/73 |
| 11,982,613 B2* | 5/2024 | Shao | G01N 17/02 |

(Continued)

FOREIGN PATENT DOCUMENTS

| | | |
|---|---|---|
| GB | 2621567 A | 2/2024 |
| KR | 102008973 B1 | 8/2019 |

OTHER PUBLICATIONS

Anonymous, Inference Engine. Wikipedia [online] [retrieved Jun. 5, 2025] <URL:https://https://en.wikipedia.org/wiki/Inference_engine> (Year: 2025).*

(Continued)

*Primary Examiner* — Ian L Lemieux
(74) *Attorney, Agent, or Firm* — PROI Intellectual Property US

(57) ABSTRACT

For determining one or more material properties of an object (10), radiation of different wavelength ranges from at least one radiation source (2) is projected onto the object (10), in a temporal sequence, one wavelength at a time. The different wavelength ranges of radiation projected onto the object (10) and the temporal sequence are pre-set by an Artificial Intelligence (AI) model engine (8) provided by a data acquisition and evaluation system (7). Radiation reflected by the object (10) is captured by one or more multi-spectral image acquisition devices (12), and multiple images, and corresponding image data, are generated according to the reflected radiation of multiple wavelengths respectively. A set of raw data is formed to output to the data acquisition and evaluation system (7) for data analysis to determine one or more material properties of the object (10), wherein the set of raw data comprises the image data.

20 Claims, 4 Drawing Sheets

(58) Field of Classification Search
CPC ....... G06T 7/0004; G06T 7/001; G06T 7/269; G06V 10/454; G06V 10/764; G06V 20/10
See application file for complete search history.

(56) References Cited

U.S. PATENT DOCUMENTS

| | | |
|---|---|---|
| 2015/0330905 A1 | 11/2015 | Sato et al. |
| 2021/0056678 A1 | 2/2021 | Al Shehri et al. |
| 2021/0082098 A1* | 3/2021 | Kumbhare ............ G06T 7/0004 |
| 2021/0319265 A1* | 10/2021 | Fang ................... G06V 10/764 |
| 2021/0396842 A1 | 12/2021 | Li et al. |
| 2023/0244836 A1* | 8/2023 | Veronesi ................ G06F 30/27 703/6 |
| 2024/0053287 A1* | 2/2024 | Aljarro ................ G06T 7/0004 |

OTHER PUBLICATIONS

Anonymous, Expert System. Wikipedia [online] [retrieved Jun. 5, 2025] <URL:https://en.wikipedia.org/wiki/Expert_system> (Year: 2025).*

Schalkoff, R., Artificial Intelligence: An Engineering Approach, McGraw-Hill, New York (1990), ISBN 0-07-0550840; pp. 281-285 (Year: 1990).*

* cited by examiner

AI-BASED AUTOMATED CLASSIFICATION AND DETERMINATION OF MATERIAL PROPERTIES OF OBJECTS

BACKGROUND OF THE INVENTION

Field of the Invention

The present invention relates to a method and a system for inspecting objects to detect damages thereof. The present invention is particularly suitable for inspecting objects that may be difficult for humans to observe or access to detect damaged objects. Typical examples of such objects include underground pipelines, such as sewers, but application of the present invention is not limited to detection of potential damage of pipelines, whether underground or aboveground; it is applicable to other structures, as well.

Description of the Related Art

There are many underground pipelines in urban construction, such as sewers, underground gas pipelines, clean water pipelines, power pipelines, communication pipelines, national defense pipelines, etc. Each kind of these pipelines usually form a complicated network covering a large geographic area and requiring the use of a great number of tunnels, tubes, cables, etc. It is common practice that such pipelines are built for long-term use. In many parts of the world, such pipelines have been in use for a great number of years.

It is necessary to inspect underground pipelines from time to time for important reasons-damage of the pipelines, when reaching a certain degree, can lead to not only malfunction or unavailability of the operation implemented by the pipelines, but also to humanitarian and environmental hazards. Many countries have made regular inspection of certain public underground pipelines legally obligatory. Regular or timely inspection of underground pipelines helps to detect pipeline damages at an early stage. Both an early detection and a quick detection can reduce the amount of maintenance or repair needed and save the public a great deal of cost.

A majority of the urban pipelines are constructed underground. Inspection of such pipelines, which are usually large, partially filled, and continually operating, constitutes a particular challenge for sewer operators. Inspection, maintenance, repair, and/or upgrade of the pipelines are usually performed by personnel physically accessing the pipelines, which requires special safety precautions. At least for inspection, personnel may use video equipment to record an inspection job which is afterwards reviewed to look for damages. While this provides some assistance, it is time consuming and prone to errors, e.g., because personnel fails to recognize damages. There is, therefore, a need for an improved technology for inspecting pipelines.

BRIEF SUMMARY OF THE INVENTION

It is an object of the present invention to provide a method and a system that facilitate detection of damage of objects in general. In particular, it is an object of the present invention to provide a method and a system that facilitate pipeline inspection for damage-detection purposes.

Accordingly, one aspect of the disclosed technology relates to a method for determining one or more material properties of an object. The method includes projecting radiation of different wavelength ranges from at least one radiation source onto the object in a temporal sequence, one wavelength range at a time. The different wavelength ranges of radiation projected onto the object and the temporal sequence are pre-set by an Artificial Intelligence (AI) model provided by a data acquisition and evaluation system. The method includes further capturing, by one or more multi-spectral image acquisition devices, radiation reflected by the object and generating multiple images according to the reflected radiation of multiple wavelength ranges respectively. The method includes forming a set of raw data to output to the data acquisition and evaluation system for data analysis, and analyzing, by the data acquisition and evaluation system, the raw data to determine one or more material properties of the object. The set of raw data includes the multiple images generated.

Another aspect of the disclosed technology relates to a system for determining one or more material properties of an object. The system includes a data acquisition and evaluation system comprising an Artificial Intelligence (AI) model engine. Further, the system includes at least one radiation source configured to emit radiation of different wavelength ranges in a temporal sequence, one wavelength at a time, for being projected onto the object, wherein the different wavelength ranges of radiation and the temporal sequence are pre-set by the Artificial Intelligence (AI) model provided by the data acquisition and evaluation system. At least one multi-spectral image acquisition device is configured to capture radiation reflected by the object and to generate multiple images, and corresponding image data, according to the respective reflected radiation of multiple wavelength ranges. A controller of the system is coupled to the data acquisition and evaluation system, the at least one radiation source and the at least one multi-spectral image acquisition device. The controller controlling the at least one radiation source according the pre-set temporal sequence, and synchronizing the at least one multi-spectral image acquisition device. The data acquisition and evaluation system is configured to analyze the set of raw to determine one or more material properties of the object.

In one embodiment, the data acquisition and evaluation system determines a classification of the one or more material properties of the object according to the determined one or more material properties. The classification includes, for example, at least one class for at least one of a crack-like shape, a plant-like shape, a plant root-like shape, a stain-like shape, a chipped-off shape and a depth profile. It is contemplated that the classification may include additional shapes and/or profiles typically encountered, for example, in underground pipelines. Such classification may be used for statistical analysis of the object or a similar object in the same or similar environment.

In one embodiment, the data acquisition and evaluation system determines whether the one or more material properties are indicative of a damage of the object. The determination is based on the classification of the one or more material properties. The classification may indicate—e.g., in case of a crack-like shape, a plant-like shape, a plant root-like shape, or a chipped-off shape—that the damage is a structural defect (e.g., one or more cracks, corrosion, one or more inorganic deposits, mechanical wear), or that the damage is organic material (e.g., one or more roots, one or more organic deposits) or—in case of a stain-like shape—a surface defect (e.g., surface contamination, infiltration). The classification may include a depth profile which indicates that the damage may be one or more obstacles that may reduce the inner diameter of a pipeline.

The object may be a pipeline of an underground urban sewage system, a gas pipeline, a clean/drinking water pipeline, a power pipeline, or a communications pipeline. In another embodiment, the object may be a stone wall. These objects are arranged in a certain environment (e.g., underground in soil) and subject to inspection to determine if any damage exists that may degrade the proper use or purpose of the object. For example, the one or more material properties may be indicative of one or more cracks in a sewage pipeline; a crack may cause sewage water to seep into the ground. In a drinking water pipeline, a crack may cause, e.g., soil to be washed-in and to contaminate the drinking water. The one or more material properties may be indicative of one or more ingrown roots, which may restrict water flow and/or contaminate the drinking water. Over time, such damage, whether caused, e.g., by cracks, wear, deposits, infiltrations or roots, may lead to further degradation of the object. Early detection is, therefore, beneficial, e.g. to reduce or avoid further damage.

In one embodiment, the AI model labels the set of raw data provided to the data acquisition and evaluation system to generate labelled data. The labelled data determine the classification of the one or more properties of the material. The labelled data is indicative of at least one of the crack-like shape, the root-like shape, the stain-like shape, the chipped-off shape, and the depth profile.

In one embodiment, the labelling is performed according to a set of AI rules used by the AI model for determining the one or more material properties of the object. The set of AI rules is obtained by training the AI model engine. For example, during training the AI model engine, an operator reviews images taken under light of different wavelength ranges to determine if any material properties of particular shapes are visible therein. For example, any material property visible in an image under a certain wavelength range is classified as one of a crack if the shape looks like a crack or a root if the shape looks like a root. In such a situation, the operator adds corresponding information to the image's data set; without limitation, one exemplary format for the AI rule maybe as follows: wavelength range: IR light, shape: oblong, root-like, material property: root). In one embodiment, the same material property (e.g., root) is characterized using an image taken under different illumination (e.g., UV light).

In one embodiment, initially the set of AI rules are preset based on an existing collection of data concerning material classification and material properties. The A1 rules can be preset during training the AI model engine.

In one embodiment, the AI model is updated using the generated labelled data. Such an update may be scheduled at regular intervals using generated labelled data obtained between the intervals, or each time new generated labelled data is available.

In one embodiment, further labelled data is used to retrain the AI model. In one embodiment, the further labelled data is obtained by repeating the forming of a set of raw data and labeling the so-obtained set of raw data. In another embodiment, the further labelled data is obtained from another data acquisition and evaluation system configured to label a set of raw data. In yet another embodiment, the further labelled data is obtained from one or more data sources.

In one embodiment, the AI model can be retrained by a modified set of AI rules according to the labelled data. The modified set of AI rules may be based on human feedback, e.g., by the operator. This allows updating and adjusting the AI model in view of a newly occurring and/or observed material property.

In one embodiment, a subset of the labelled data is selected and used for retraining the AI model. In one embodiment, the data acquisition and evaluation system is configured for this selection and use.

In one embodiment, 3D-characteristic data of the one or more material properties is obtained. The obtained 3D-characteristic data is included in the set of raw data for data analysis by the data acquisition and evaluation system. Determining the one or more material properties of the object is further based on the obtained 3D-characteristic data. In case the generated images and image data are limited 2D information, the obtained 3D-characteristic data provide for an additional dimension which indicates the spatial profile of the one or more material properties, e.g., if it is flat or has a 3D-depth structure.

In one embodiment, one or more detectors are provided to obtain the 3D-characteristic data of the one or more material properties. Examples of such a detector include a 3D-camera system, a LIDAR system and a radar system.

In one embodiment, one or more metadata of the one or more material properties of the object are obtained. The obtained one or more metadata of the one or more material properties of the object are included in the set of raw data for data analysis by the data acquisition and evaluation system. Determining the one or more material properties of the object is further based on the one or more metadata provided. The one or more metadata of the one or more material properties of the object may include any one of the following: temperature; humidity; pH-value; and conductivity. One or more sensors may be provided to detect the one or more metadata.

The method and system described herein provide for an improved approach for inspecting an object, e.g., any kind of pipeline, to detect and evaluate any damage to the object as early as possible to initiate mitigating measures if deemed necessary. A damage, as used herein, may be indicated by the determined material properties of the object and include a structural defect (e.g., cracks, obstacles, corrosion, inorganic deposits, chipped-off material, mechanical wear), a defect due to organic material (e.g., roots, organic deposits) and surface defects (e.g., surface contamination, chipped-off material, flaking-off paint, infiltration), or a combination of these defects. A mitigating measure may include, e.g., sending personnel to the site of the detected defect and have any deposits or roots removed and/or any crack repaired.

According to the method and the system, radiation of different wavelength ranges is projected onto the object in a temporal sequence, one wavelength range at a time. The temporal sequence allows, for example, obtaining images (and corresponding raw data) from essentially the same location of the object under different irradiation. Each image taken under one the irradiations and showing that location can be analyzed. If there is any unusual shape or pattern at that location, each image and the unusual shape can be analyzed in view of the respective irradiation to determine the material property of the object, which can then be used to determine if the object is damaged at that location.

The method and system described herein generally improve visualization of sensor data and any damage. Current sensor and image data can be compared with corresponding data obtained by prior measurements, e.g., by an operator and/or an analysis system.

The method and system described herein provide for an AI-based automated classification and determination of material properties of objects. An advantage is that an operator's visual analysis of a stream of images or a video, which may be tedious, time consuming and expensive, is no longer needed or can be substantially reduced.

Further, the AI-based automated classification and determination of material properties allows detecting and recognizing complex signals buried in or superimposed by noise. Such complex signals may otherwise not be recognizable.

BRIEF DESCRIPTION OF THE SEVERAL VIEWS OF THE DRAWINGS

The accompanying drawings, which are incorporated in and constitute a part of this disclosure, illustrate exemplary embodiments and, together with the description, serve to explain the disclosed principles. In the drawings, same components are referenced by the same reference numerals. In the drawings.

DETAILED DESCRIPTION OF THE INVENTION

Figure 1:
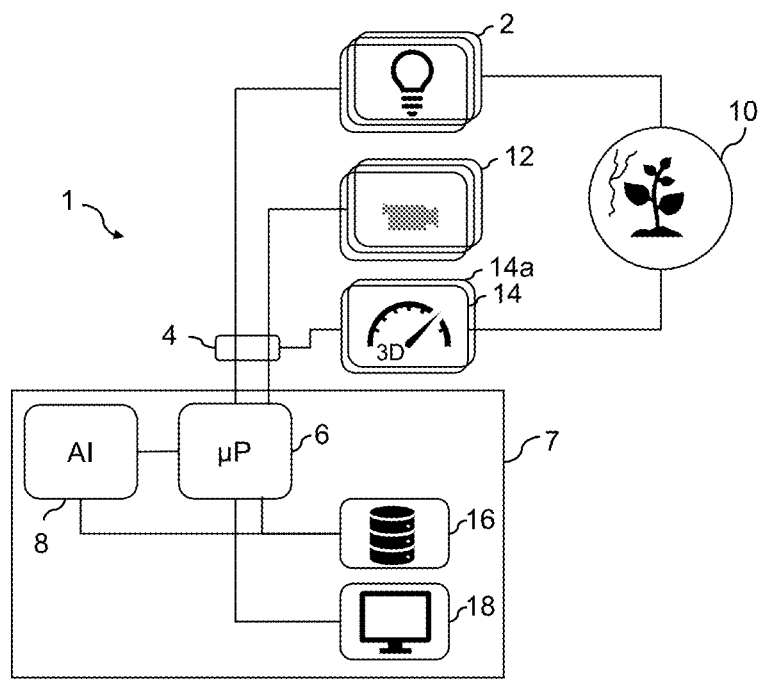
FIG. 1 shows a schematic illustration of one embodiment of a system for determining one or more material properties of an object.

FIG. 1 shows a schematic illustration of one embodiment of a system 1 for determining one or more material properties of an object 10. Embodiments of the system 1 are described with reference to a pipeline as one example of an object 10 and identified by reference numeral 10. The pipeline 10 has a circular cross-section and may belong to an underground urban sewage system that is, for example, subject to inspection. It is contemplated that the pipeline 10, whether underground or aboveground, may be a gas pipeline, a clean/drinking water pipeline, a power pipeline, or a communication pipeline. In yet another embodiment, the object 10 may be another structural environment, such as a stone wall.

In use, at least a part of the system 1 is located inside (in case of a pipeline 10) or in proximity (in case of a stone wall) of the object 10 so that at least one material property of the object 10 can be determined using the technology described herein. The one or more material properties of the object 10 can have a crack-like shape, a plant-like shape, a root-like shape, a stain-like shape, a chipped-off shape, a flaked-off shape or a depth profile. Such material properties may be indicative of one or more cracks, mechanical/structural wear, organic or inorganic deposits, infiltrations, plant material (e.g., roots), one or more obstacles, corrosion, flaking-off paint, chipped-off material, surface contamination or mechanical wear. Any of these material properties may indicate a damage or defect of the object 10.

For illustrative purposes, FIG. 1 shows a plant-like shape representing plant material that penetrates and/or obstructs the pipeline 10. A depth profile may be another material property that is indicative of plant material. The plant material is indicative of one example of a damage of the pipeline 10. As another example of a material property, and also for illustrative purposes, FIG. 1 shows a crack-like shape indicative of a crack (or group of cracks). Depending on the extent of the crack (e.g., its size and/or depth), a depth profile may be another material property that is indicative of a crack.

An exemplary use of the system 1 involves the inspection of a sewer pipeline, wherein one or more components of the system 1 are introduced into the pipeline, e.g., at an access point which may be a manhole. The sewer pipeline is usually documented, e.g., in a city's documentation of its pipeline system. The one or more components may be mounted to a carrier structure that is configured to move along the inside of the pipeline. The carrier structure may be a motorized robot or vehicle, each may be configured to move autonomously inside the pipeline, or under remote control of an operator positioned outside the pipeline, e.g., in a service car at street level. In one embodiment, the carrier structure is a robot. The remote control may be by wire or wireless, depending on the environment and its suitability for radio transmissions. If a wired communication link is provided it may be used (in addition to transmitting remote control commands) for a data communication between a component mounted on the robot inside the pipeline and a processing entity arranged in the service car. The carrier structure may be controlled to move at an adjustable speed, step-by-step or continuously, while the carrier structure's movement is recorded, e.g., as a function of time and distance from the place of introduction into the pipeline. As described below, recording the movement allows determining a location where one or more images are taken; in one embodiment, an image is associated with data representing a time stamp and a location stamp.

In one embodiment, the system 1 includes a computer system 7 having a central control unit 6 (UP) and a deep learning/artificial intelligence (AI) model engine 8 (AI model engine 8). The central control unit 6 is communicatively coupled to one or more radiation sources 2, an image acquisition device 12 and a distance meter 14, which may be a 3D-laser scanner (LIDAR system). It is contemplated that the distance meter 14 is optional. Such a radiation source 2 is configured to emit radiation of a selected range (e.g., a wavelength range) within the electromagnetic spectrum, e.g., within a wavelength range that may be referred to as light, such as visible light, infrared (IR) light or ultraviolet (UV) light. Hereinafter, a radiation source 2 may be referred to as a light source 2; accordingly, the image acquisition device 12 is configured to detect light within these electromagnetic spectra, and hereinafter referred to as a camera system 12. In another embodiment, a radiation source 2 may emit radiation in the terahertz (THz) range of the electromagnetic spectrum; the, the image acquisition device 12 is then configured to detect this frequency range.

Briefly, using a switch unit 4, the central control unit 6 operates according a preset schedule to control the one or more light sources 2 in a temporal sequence to selectively project radiation, one wavelength range at a time, onto the inside of the pipeline 10 at about the current location of the robot and, e.g., mainly in forward-looking direction of the robot. Hence, the pipeline's inside is illuminated sequentially with light of different wavelength ranges, e.g., when the robot is stopped so that images are taken from about the same location, or when the robot is moving (e.g., slowly) and the illumination with light of different wavelength ranges takes place at a relatively high frequency so that images are taken from about the same location. The camera system 12 detects reflected radiation (light) and generates images of the illuminated inside of the pipeline 10; for each wavelength range at least one image. As the camera system 12 is a multi-spectral image acquisition device and sensitive to different wavelength ranges, it is adapted to generate multi-spectral images. The central control unit 6 is further communicatively coupled to a storage device 16, a personal computer 18 and the deep learning/artificial intelligence (AI) model engine 8. Under control of the central control unit 6, the AI model engine 8 analyzes raw data corresponding to the generated images to automatically determine one or more material properties of the object 10 detectable in at least one of the generated images.

Figure 2:
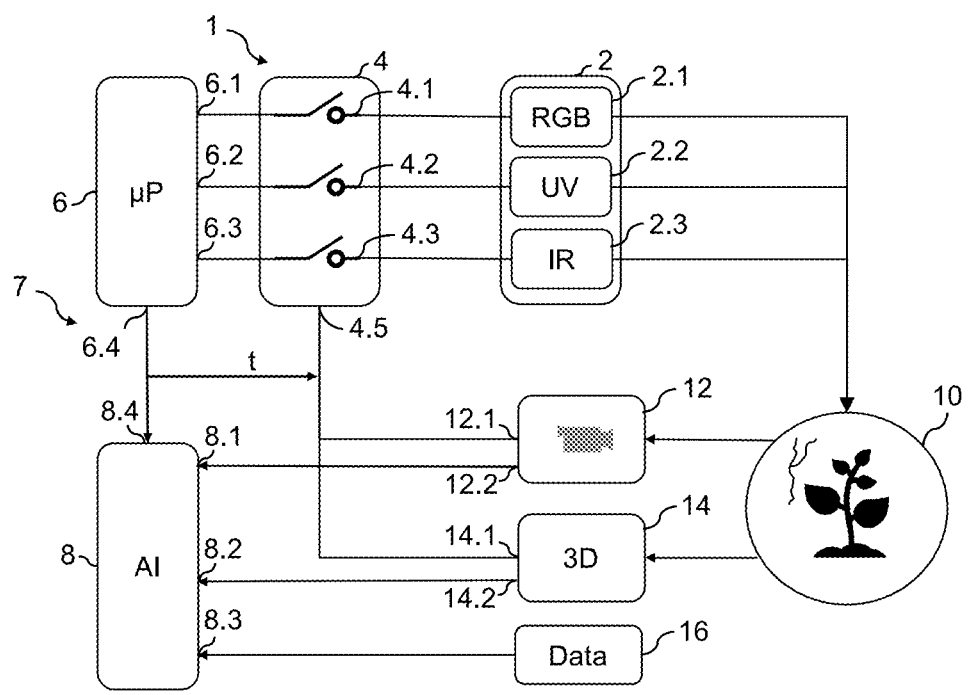
FIG. 2 shows a schematic illustration of the system of FIG. 1 with additional system components.

FIG. 2 shows a schematic illustration of the system of FIG. 1 with additional system components. In the illustrated exemplary embodiment, the central control unit 6 has output ports 6.1, 6.2, 6.3, 6.4, the switch unit 4 has three switches 4.1, 4.2, 4.3 (each shown in an open position), and three light sources 2 are shown: a red-green-blue (RGB) light source 2.1, an ultraviolet (UV) light source 2.2 and an infrared (IR) light source 2.3. Each light source 2.1-2.3 is connected to a switch 4.1, 4.2, 4.3 of the switch unit 4. When the switches 4.1-4.3 are closed, e.g., triggered by control signals received at a switch input port 4.5 from an output port 6.4 of the central control unit 6, each light source 2.1-2.3 is connected to the respective output port 6.1-6.3.

Once a switch 4.1-4.3 is closed, the central control unit 6 is configured to selectively control and activate the respective light source 2.1-2.3. For example, the central control unit 6 activates one light source 2.1-2.3 after another, each for a set length of time by closing the respective switch 4.1-4.4 and/or sending an activation signal over the output ports 6.1-6.3 for the set length of time, according to a set temporal sequence of illumination. In certain applications, only selected ones of the light sources 2 (e.g., the UV and IR light sources 2.2, 2.3) may be activated. It is contemplated that while the exemplary embodiment of FIG. 2 is configured for use of three light sources 2, another embodiment may be configured for less or more than three light sources 2, e.g., each having a selected wavelength range; in one embodiment, a wavelength range may correspond to the THz range.

Generally, the sequence and the illumination time depend on the type of object and/or the material property or damage being examined, the temporal sequence and illumination time may be pre-determined by an operator having observed and analyzed a number of images of different objects 10 (with and without material properties (damages)). For example, one kind of damage (characterized by one or more material properties) of a certain object 10 may be best detectable and/or visible in the visible light spectrum with a short illumination time so that the object 10 may be illuminated first with visible light and then (shortly thereafter) with light of a different wavelength range. Or, a different kind of damage of another object 10 may be best detectable and/or visible in the infrared spectrum requiring a relative long illumination time, which may then be the light source 2 to be activated first. It is contemplated that a suitable illumination time can be determined by evaluating and analyzing existing images, or experimentation. Likewise, the frequency with which the irradiation with light of different wavelength ranges is changed, can be determined by evaluating and analyzing existing images, or experimentation. For example, certain materials may be luminescent when irradiated with light of a certain wavelength range. To avoid taking an image that may be affected by a material's luminescence, the irradiation frequency is set accordingly; e.g., so that the luminescence is no longer detectable.

In the embodiment of FIG. 2, the camera system 12 is configured to detect the light emitted by the light sources 2. The camera system 12 can detect visible (RGB) light, UV light and IR light and can generate digital images for each one of these wavelength ranges. The digital images are in the form of raw data. Depending on a particular configuration, the camera system 12 can be configured to be sensitive to light over a wide wavelength range, spanning from UV light over visible light to infrared light. In another embodiment, the camera system 12 can include a set of separate sensors each being sensitive for a specific wavelength range. The sensors may include CMOS sensors. CMOS-sensor based cameras are commercially available, e.g., from companies such as Hamamatsu Photonics K. K (JP) and Canon Medical Components (U.S.A.).

Figure 3:
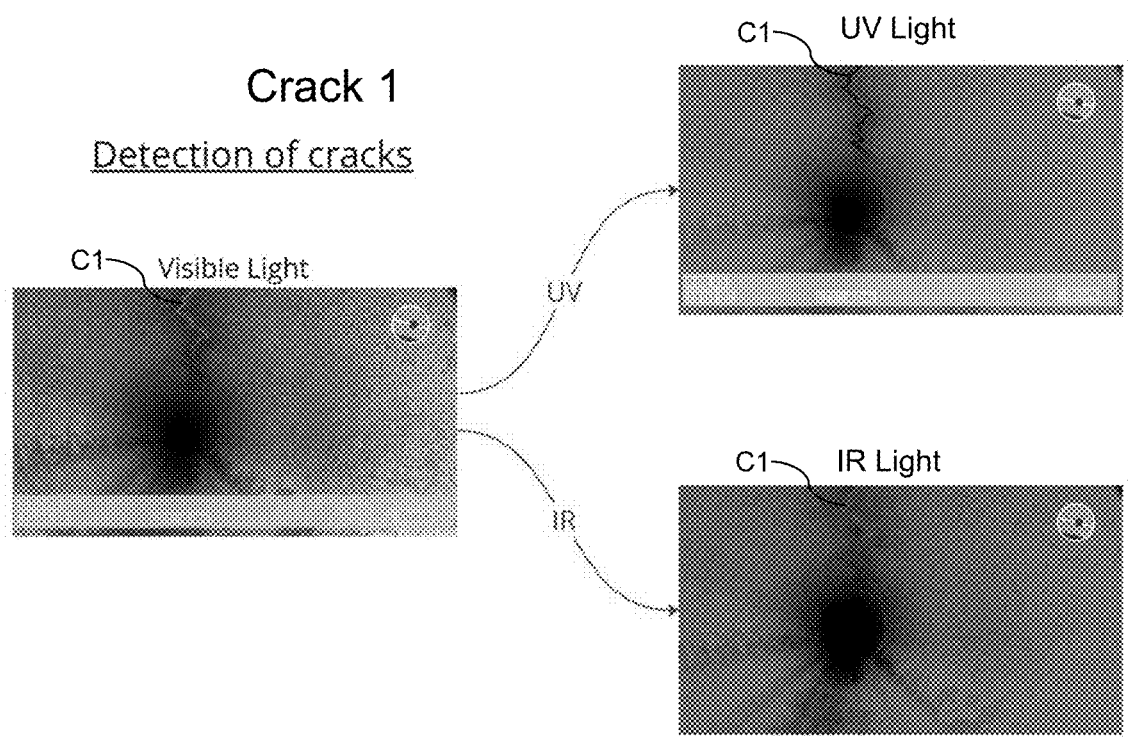
FIG. 3 shows exemplary images of an interior of a pipeline having a first crack and being illuminated by visible light, UV light and IR light.
Figure 4:
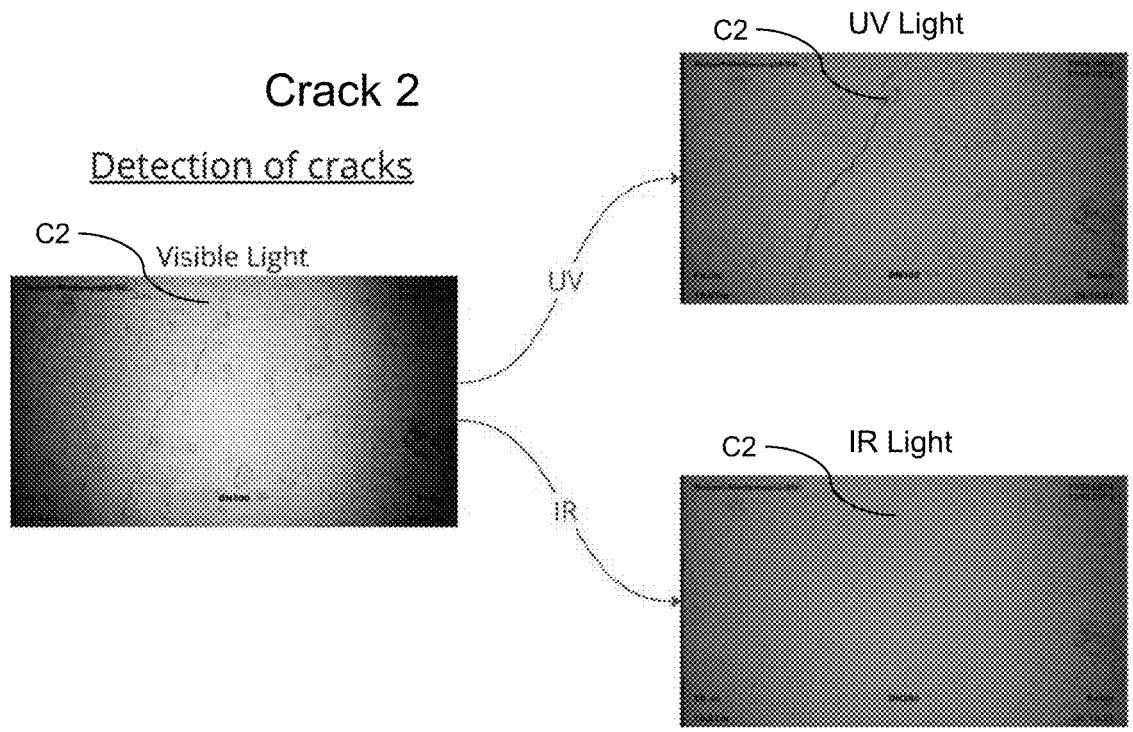
FIG. 4 shows exemplary images of an interior of a pipeline having a second crack and being illuminated by visible light, UV light and IR light.
Figure 5:
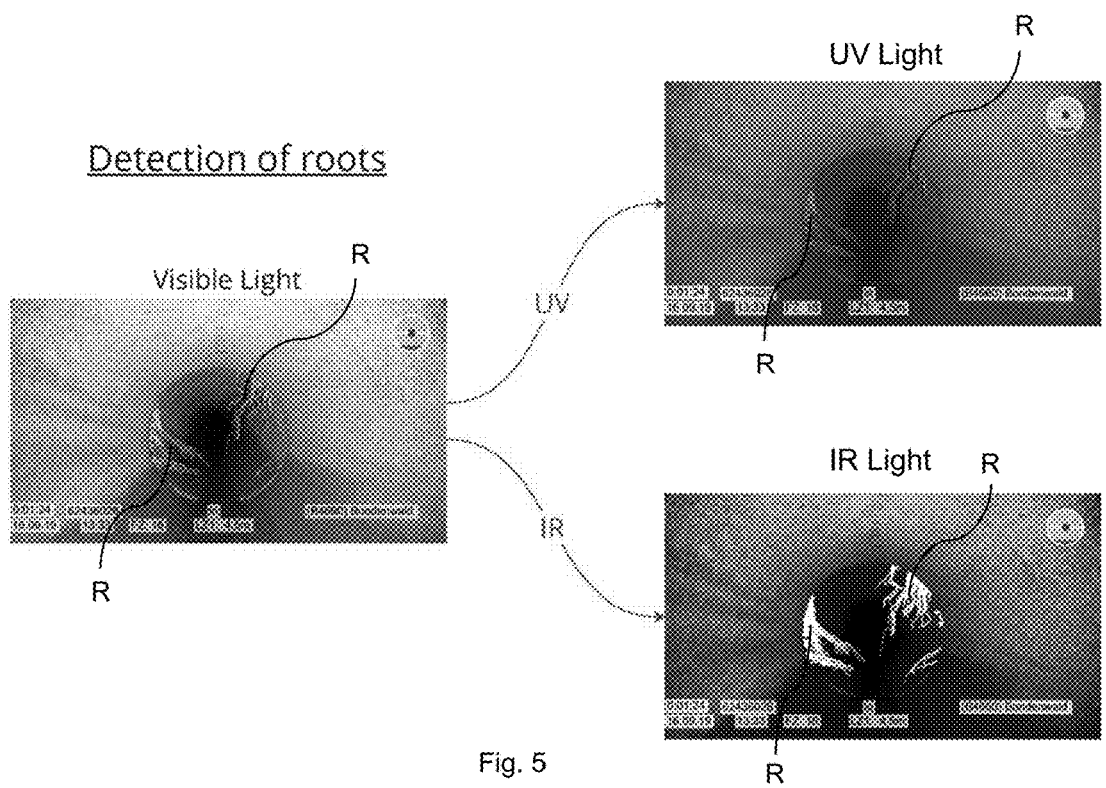
FIG. 5 shows exemplary images of an interior of a pipeline with ingrown roots and being illuminated by visible light, UV light and IR light.
Figure 6:
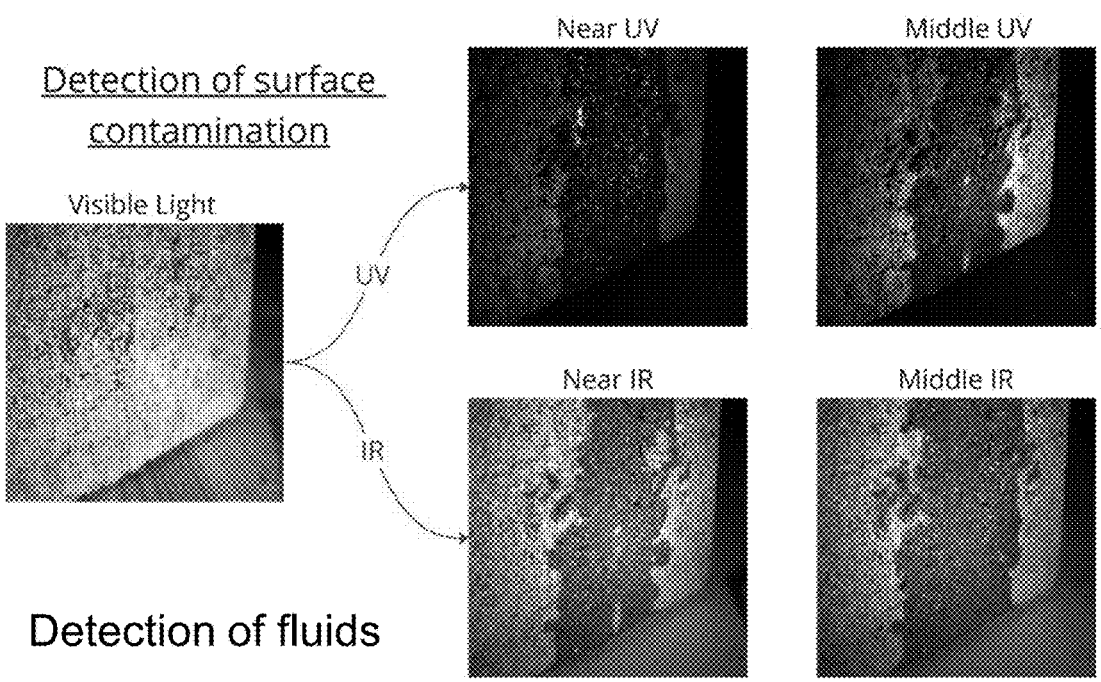
FIG. 6 shows exemplary images of a wall surface illuminated by visible light, UV light and IR light.

Exemplary images generated by the camera system 12 are shown in FIG. 3-FIG. 6, wherein each image shows an interior of the pipeline 10 to be inspected according to one application of the technology described herein. In each image a material property of the object 10 is shown. FIGS. 3-4 show images of the pipeline 10, wherein in each image the material property is a crack-like shape, FIG. 5 shows images of the pipeline 10, wherein the material property is a plant root shape, wherein it is visible that the root grew into the pipeline 10, and FIG. 6 shows images of a wall surface, wherein the material property is a stain shape which may indicate a kind of contamination, corrosion or flakin-off paint. An operator may use such images to describe the respective material property for each wavelength range. The operator may further classify the material properties, e.g., as being indicative of the various kinds of damages.

In FIG. 3, regarding a crack-like shape as one example of a material property, the pipeline 10 made of concrete or ceramic is damaged and has a first crack C1 which is visible in an image taken under visible light (left side of FIG. 3), in an image taken under UV light (upper right side of FIG. 3) and in an image taken under IR light (lower right side of FIG. 3). To the human eye, the first crack C1 appears to be best visible under UV light as it contrasts from the surrounding areas. Under IR light, however, the first crack C1 is barely visible, e.g., because of the absence of temperature differences between the surface of the pipeline 10 and the space within the crack C1. A second crack C2 in the pipeline 10 is visible in the images of FIG. 4, again taken under visible light (left side of FIG. 4), UV light (upper right side of FIG. 4) and IR light (lower right side of FIG. 4). Again under UV light, the second crack C2 appears to be best visible. As to the illumination sequence implemented by the system 1, UV light may be used first followed by visible light and IR light. Neither the crack C1 nor the crack C2 show in these images a depth profile which may indicate how deep the cracks C1, C2 are.

Regarding a plant root shape as one example of a material property, the images in FIG. 5 show that roots R have grown into the interior of the pipeline 10. The roots R are visible in the image taken under visible light (left side of FIG. 5), in the image taken under UV light (upper right side of FIG. 5) and in the image taken under IR light (lower right side of FIG. 5). The roots R, as organic material, have the highest contrast with respect to its surrounding area and appear, therefore, to be best visible under IR light, e.g., because of temperature differences between the surface of the pipeline and the roots R, and visible light. In addition, FIG. 5 shows that another material property is a depth profile because the plant roots grow into the pipeline's interior and are visible in the foreground against the dark background. As to the illumination sequence implemented by the system 1, IR light may be used first followed by visible light and UV light.

FIG. 6 shows exemplary images generated by the camera system 12 according to another application of the technology described herein. The images show an example of a wall surface that is to be inspected, e.g., to detect a material property such as a stain-like shape indicative of fluids or surface contaminations. In FIG. 6, the wall surface is partially covered with a fluid that is more or less visible depending on the light (wavelength range) used to illuminate the wall surface. In the image of the wall surface taken under visible light (left side of FIG. 6), the fluid is not visible. However, the fluid is clearly visible in the two images taken under IR light (lower right side of FIG. 6), wherein the left image is taken under two different IR wavelength ranges (near IR light (left image) and middle IR light (right image)). For example, running and/or evaporating water, as one example of a fluid, leads to temperature differences that are visible/detectable when illuminated by IR light. Suitable IR wavelength ranges can be determined by evaluating and analyzing existing images, or experimentation.

The fluid is also visible in the two images taken under UV light (upper right side of FIG. 6), wherein the left image is taken under near UV light and the right image is taken under middle UV light. Suitable UV wavelength ranges can be determined by evaluating and analyzing existing images, or experimentation. The visibility of the fluid under UV light is less than under IR light, wherein the fluid's visibility is about the same under near IR light and under middle IR light, however, different details are visible under these IR illuminations. As to the illumination sequence implemented by the system 1, the near IR light and the middle IR light may be used first followed by the middle/middle UV lights and the visible light.

Referring again to FIG. 2, the central control unit 6 synchronizes the operation of the switch unit 4, the operation of the light sources 2, the operation of the camera system 12 and the AI model engine 8. For that purpose, the central control unit's output port 6.4 is in the illustrated embodiment coupled to the port 4.5 of the switch unit 4, an input port 12.1 of the camera system 12, and an input port 8.4 of the AI model engine 8. Considering the UV light source 2.2, for example, the central control unit 6 activates the switch 4.2 via the input port 4.5, the camera system 12 via its input port 12.1 to detect reflected light, which is in this case UV light, and the AI model engine 8 via its input port 8.4 to analyze an image (and its image data) taken under UV light illumination. In an analogous manner, these operations are synchronized when visible light or IR light are used.

The operation of the distance meter 14 (present in the illustrated embodiment) is synchronized, as well. For that purpose, an input port 14.1 of the distance meter 14 is coupled to the central control unit's output port 6.4. An output port 14.2 of the distance meter 14 is coupled to the input port 8.2 of the AI model engine 8. In one embodiment, the distance meter 14 includes a LIDAR (3D) laser scanner which includes a 3D-acquisition device for acquiring point cloud data about the geometry of the surrounding environment. The collected data may be referred to as a point cloud. A point cloud includes the points that are sampled from the surface of the subject of interest. The 3D-acquisition device shares some traits with a camera in that it has a field of view and can only collect information about an object that is not occluded. While a camera can collect, for example, colors of the surface, a 3D-scanner collects geometric information such as the position of the sampled points, the surface normal and distances between the points and the 3D-scanner. From the object's geometric information, the subject's 3D-depth profile or structure can be determined.

After the acquisition phase, the point cloud data is included as 3D-characteristic data of the material property of the object 10 in the set of raw data for data analysis by the data acquisition and evaluation system 7. The 3D-chracteristic data includes at least one parameter representing, for example, shape, surface structure (e.g., ridges, valleys), size, orientation (e.g., vertical, horizontal, sloping) surface area, and structure. For example, compared to the generated 2D images and image data, the obtained 3D-characteristic data provide for an additional dimension which indicates a spatial profile, e.g., if the material property is flat (e.g., in case of a surface contamination) or has a 3D-depth structure (e.g., in case of a deep crack or an ingrown root). The raw data is fed via the output port 14.2 to the input port 8.2 of the AI model engine 8 to be processed by a sequence of algorithms to determine one or more material properties present in the field of view.

In addition, in one embodiment, one or more metadata of the object 10 are obtained. The obtained one or more metadata of the object 10 is included in the set of raw data for data analysis by the data acquisition and evaluation system 7. Determining the one or more material properties of the object 10 is further based on the one or more metadata provided. The one or more metadata of the object 10 includes temperature, humidity, pH-value and conductivity. To obtain the one or more metadata, the system 1 may be provided with suitable sensors 14a (e.g., a thermometer, hygrometers, pH and conductivity meters), as indicated in FIG. 1.

The storage device 16 (Data) has an output port coupled to the input port 8.3 of the AI model engine 8. The storage device 16 is accessible (readable) by the A1 model engine 8, wherein access may be controlled by the processor 6, and configured to store program instructions performed by the AI model engine 8 and recorded in computer-readable media. The computer-readable media may include, alone or in combination with program instructions, a data file, a data structure, and the like. The program instructions recorded in the media may be specially designed and configured for the example embodiments disclosed herein or may be known to one of ordinary skill in the computer software art and thereby available. Examples of the media include magnetic media such as hard disks, floppy disks, and magnetic tapes; optical media such as CD-ROM and DVDs; magneto-optical media such as optical disks; and hardware devices that are specially configured to store program instructions, such as read-only memory (ROM), random access memory (RAM), flash memory, and the like. Examples of the program instruction may include a machine language code as produced by a compiler and include a high-language code executable by a computer using an interpreter and the like.

Depending on a particular implementation of the system 1, image processing may be performed by the computer 18 and/or the camera system 12 of the system data acquisition and evaluation system 7. An image processing module (suitable hardware and software) is configured to process and analyze the images generated by the camera system 12. The image processing includes in one embodiment a technology known as object detection and recognition. Object detection technology using camera sensor information is known in the field of computer vision. Object detection generally detects instances of "objects" of a certain class in digital images and videos (in the present description, the "object" to be determined is a material property of the object 10). The object detection and recognition technology is described, for example, in: Stamatia Dasiopoulou, et al., Knowledge-Assisted Semantic Video Object Detection, IEEE Transactions on Circuits and Systems for Video Technology, Vol. 15, No. 10, October 2005, p. 1210-1224. Analyzing images containing contour outlines is described in Vittorio Ferrari, et al., Object Detection by Contour Segment Networks, ETHZ-Computer Vision Lab: Publications", Vision.ee.ethz.ch.

The data acquisition and evaluation system 7 is configured to use machine learning as a part of AI technology, including applying a deep neural network (DNN) structure to improve automatic object recognition (here: automatic recognition of a material property). Deep learning technology assists in performing an object recognition at a very high level of accuracy by learning to acquire high-dimensional feature values from a large amount of image data. Training can make machines learn objects like humans, where the learning process improves the correctness of recognition so that the accuracy for object recognition continues to rise and maintain a certain correctness. The prediction part is performed after the machine training, and an object can be actively predicted without assistance and correction. The types of machine learning include supervised learning, unsupervised learning and semi-supervised learning, where supervised learning provides standard results of object recognition, to determine a deviation of object recognition in machine learning, and thus improve the accuracy of predictions. Supervised learning involves actions of labeling the data, and retrieve features from the inputted data for predictions (e.g., recognizing object or determining result). Supervised learning is used in connection with the technology described herein. An overview of the deep learning technology is described in: Yann LeCun, et al., Deep Learning, Nature. 521 (7553), 2015, p. 436-444.

In one embodiment, the storage device 16 stores a multitude of data sets related to sample images that have been subject to the object detection and recognition process mentioned above. The sample images include images which show various kinds of material properties (e.g., a crack-like shape, a plant-like shape, a plant root-like shape, a stain-like shape, a chipped-off shape and a depth profile) and which are obtained under different lighting conditions enabled by the light sources 2. For each sample image and each light condition, the process obtains data that describe features of the detected material property, e.g., contrast, color, orientation, number, area, shape, length, thickness, orientation. The obtained data is stored in the data set for the image.

The image-specific stored data set can then be classified or labeled, e.g., by an operator, in connection with training the AI model engine 8. For example, using the personal computer 18 shown in FIG. 1, the operator examines each image obtained under one or more of the mentioned lights and showing a crack, a root or a contamination (e.g., caused by a liquid), and classifies each image by labeling the respective data set. In one embodiment, a classification of the material properties includes classes for structural defects (e.g., cracks, obstacles, corrosion, inorganic deposits, mechanical wear), organic material (e.g., roots, organic deposits) and surface defects (e.g., surface contamination, infiltration). The data sets related to the images shown in FIG. 3 and FIG. 4, respectively, may be labeled as structural defects and/or surface defects due to the cracks. The data sets for the crack C1, for example, may include information such as that the crack C1 is visible as a dark (black) uneven line under UV light, as a bright (white) uneven line under visible light, and hardly visible under IR light. In a similar manner, the data sets related to the root(s) shown in FIG. 5 and the surface contamination shown in FIG. 6 can be classified or labeled.

Using such object recognition, the data acquisition and evaluation system 7 may detect in a real-time image from the inside of the pipeline 10 (taken under visible, IR or UV light) one or more lines of, e.g., different profiles, orientations and thicknesses (FIG. 4 and FIG. 5), or one or more contoured areas (FIG. 6), and generate a corresponding data set. The lines or areas (objects) might belong to one of the classes of material properties: structural defects (e.g., cracks), organic material (e.g. roots), and surface defects (e.g., surface contamination, infiltration). Analyzing the images taken under different lights narrows downs the possibilities and, hence, increases the likelihood that the material property is assigned to the correct class. In use, for example, the data acquisition and evaluation system 7 subjects the real-time image to the detection and recognition process and uses the generated image data to search the storage device 16 for a data set that matches the generated image data to a preset degree; if such a matching data set exists, the computer system 1 outputs an indication of the detected and recognized material property.

In one embodiment, the distance meter 14, e.g., including a 3D-laser scanner (LIDAR system), if present, is used to provide additional information. During training, the data set generated for a sample image may specify if a material property has a 3D-shape which is, e.g., the case for roots; a crack may or may not have a 3D-structure depending on the extent of the crack (e.g., its depth), whereas a surface defect (e.g., a surface contamination) usually does not have a 3D-structure.

The data acquisition and evaluation system 7 illustrated in the environment of FIG. 1 and FIG. 2 includes hardware and software configured to allow input of data and instructions, output of data and information, and interaction by an operator. The hardware may include the processor 6 (chipset), a memory, a storage device 16, an input device (keyboard, pointing device), a display, and a network adapter. The storage device 16 is a non-transitory computer-readable storage medium, such as a hard drive, compact disk read-only memory (CD-ROM), DVD, or a solid-state memory device. The memory holds instructions and data used by the processor 6. The pointing device may be a mouse, track ball, or other type of pointing device, and is used in combination with the keyboard to input data into the computer system. In one embodiment, the network adapter may be used to couple the computer system 7 to a network.

The computer 18 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device, loaded into the memory, and executed by the processor 6.

Certain devices described herein may be implemented using hardware components, software components, and/or a combination of the hardware components and the software components. For example, such devices and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

With the understanding of the basic system components described above and their functions, an example of a method for determining one or more material properties of an object 10 using the system 1 shown in FIG. 1 and FIG. 2 is described hereinafter in connection with FIG. 7 and FIG. 8. An operator provided a robot having at least the radiation sources (e.g., the light sources 2), and one or more image acquisition devices (e.g., the camera system 12) inside the pipeline 10. In one embodiment, a distance meter 14 and/or one or more sensors (14, 14a) may be mounted to the robot, as well. The AI model engine 8 has been trained, as described above. Generally, the method includes projecting radiation of different wavelength ranges from at least one radiation source 2 onto the object 10, in a temporal sequence, one wavelength at a time, wherein the different wavelength ranges of radiation projected onto the object 10 and the temporal sequence are pre-set by the AI model engine 8 provided by the data acquisition and evaluation system 7. The method includes capturing, by the one or more multi-spectral image acquisition devices 12 (camera system 12), radiation reflected by the object 10 and generating multiple images and corresponding image data according to the reflected radiation of multiple wavelength ranges, respectively. Further, the method includes forming a set of raw data to output to the data acquisition and evaluation system 7, and analyzing, 0 by the data acquisition and evaluation system 7, the raw data to determine one or more material properties of the object 10. The set of raw data includes the image data. The one or more material properties of the object 10 may include a crack-like shape, a plant-like shape, a plant root-like shape, a stain-like shape, a chipped-off shape, a flaking-off shape, and a depth profile.

Figure 7:
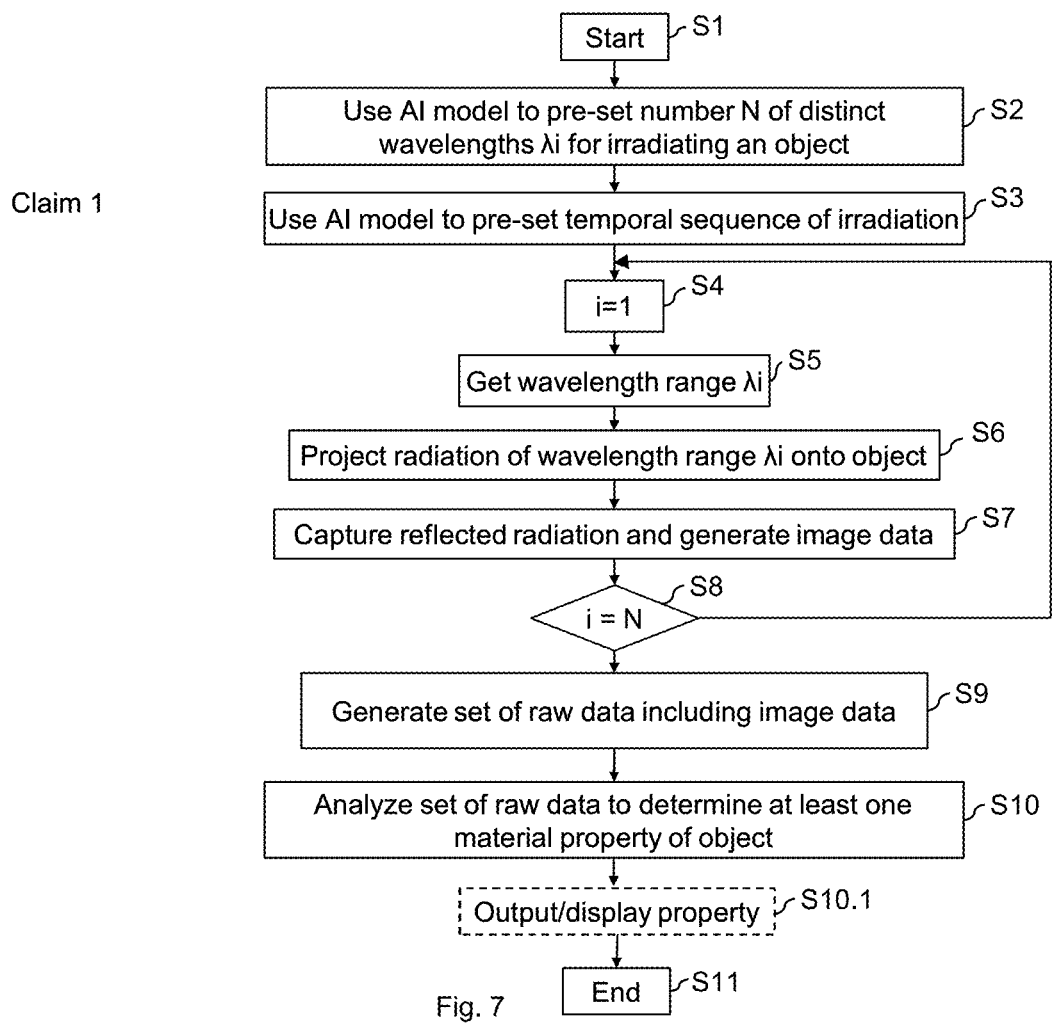
FIG. 7 is an exemplary flow chart of a method for determining one or more material properties of an object.

In one embodiment, this method can be divided into individual steps, as shown in FIG. 7. The method shown in FIG. 7 begins at a step S1 and ends at a step S11. A person skilled in the art recognizes that the division into these steps is by way of example and that one or more of these steps may be divided into one or more sub-steps or that a plurality of the steps may be combined into one step.

In a step S2, the AI model of the AI model engine 8 is used to pre-set a number N of distinct wavelength ranges $\lambda i$ for irradiating the object 10. For example, the operator may setup the system 1 for an inspection of an underground sewer pipeline as the object 10. With that information, the AI model determines that in such an environment roots may have grown into the pipeline 10 and that there may be cracks. The AI model may then select the three light sources 2 (N=3, wavelength ranges $\lambda i$) because visible light, UV light and IR light allow detecting roots and/or cracks, as mentioned above with reference to FIG. 3-FIG. 6.

In a step S3, the AI model is used to pre-set a temporal sequence of irradiation by the light sources 2. The temporal sequence can be set as mentioned above with reference to FIG. 3-FIG. 6. This can include setting the illumination time and illumination frequency.

In a loop represented by steps S4 (i=1) to S8 (i=N(3)) the three light sources 2 are activated to project radiation (light) of different wavelength ranges onto the inside of the pipeline 10, in the temporal sequence, one wavelength range at a time. In step S7, reflected radiation is captured and image data corresponding the projected light in step S6 is generated. The camera system 12 (one or more multi-spectral image acquisition devices) generate multiple images according to the reflected radiation of multiple wavelengths respectively. If i=3 in step S8, the method proceeds to a step S9.

In step S9, a set of raw data is generated that include the image data. The set of raw data is output to the data acquisition and evaluation system 7 for data analysis. If a distance meter 14 and/or one or more sensors (14, 14a) are used, information obtained by these devices may be included in the raw data.

Proceeding to a step S10, the set of raw data is analyzed to determine at least one material property of the pipeline 10. The set of raw data is analyzed by the data acquisition and evaluation system 7 and its AI model engine 8. As mentioned above, the material property of the pipeline 10 (object 10) may indicate, for example, cracks, roots and surface contaminations.

The AI-based automated classification and determination of material properties allows detecting and recognizing complex signals buried in or superimposed by noise. The AI model engine 8 is configured to determine if there is any correlation between received signals. If there is a correlation, these signals are considered to be valid and further processed regardless of any superimposed noise. For example, if the AI model engine 8 analyzes a first signal generated under visible light and second signal generated under IR light, the AI model engine 8 determines that both signals are valid if both are indicative of the same material property (e.g., a root).

In the embodiment of FIG. 7, the at least one material property of the object 10 may be output in a step S10.1. Depending on the configuration of the system 1, e.g., the at least one material property may be output to a storage device for documentation purposes and/or to a display for the operator to evaluate. In the case the property is indicative of a defective pipeline 10, measures to repair the pipeline may be planned and initiated. The method ends in the step S11.

Figure 8:
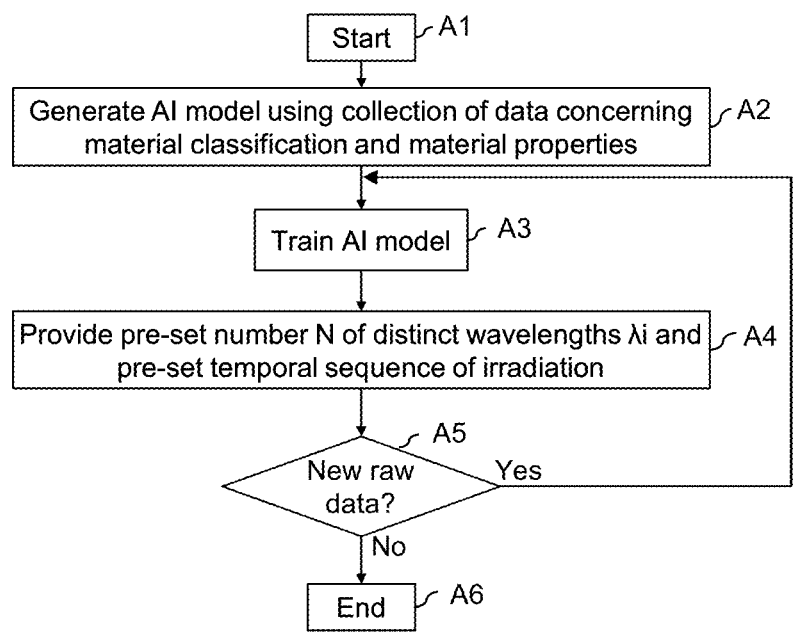
FIG. 8 is an exemplary flow chart of a method for generating a model.

FIG. 8 is an exemplary flow chart of a method for generating an AI model. The method starts at a step A1 and end at a step A6.

In a step A2, an AI model using a collection of data concerning material classification and material properties of an object 10 is generated. In a step A3, the AI model is trained using the collection of data. In embodiment, training is assisted by an operator. In a step A4, a pre-set number N of distinct wavelengths λi and pre-set temporal sequence of irradiation are provided. The operator may set these parameters based on the collection of data; for example, the operator may determine that for an underground pipeline 10 three wavelength ranges are to be used and that the temporal sequence of irradiation is, as described above, to detect typically occurring material properties, such as crack-like shapes or root-like shapes.

In a step A5, it is determined if new raw data is available. If this is the case, the method returns to step A3, otherwise the method proceeds to step A6 and ends. The new data may due to a newly occurring and/or observed material property of the object 10. The loop back to step A3, hence, allows updating and adjusting the AI model.

What is claimed is:

1. A method for determining one or more material properties of an object, comprising:
    projecting radiation of different wavelength ranges from at least one radiation source onto the object, in a temporal sequence, one wavelength range at a time, wherein the different wavelength ranges of radiation projected onto the object and the temporal sequence are pre-set by an Artificial Intelligence model engine provided by a data acquisition and evaluation system, wherein the at least one radiation source is configured to emit ultraviolet (UV) light, infrared (IR) light and visible light;
    capturing, by one or more multi-spectral image acquisition devices, radiation reflected by the object and generating multiple images, and corresponding image data, according to the reflected radiation of multiple wavelength ranges, respectively, wherein a first real-time image is taken under UV light in response to the radiation source emitting UV light, wherein a second real-time image is taken under IR light in response to the radiation source emitting IR light, and wherein a third real-time image is taken under visible light in response to the radiation source emitting visible light;
    forming a set of raw data to output to the data acquisition and evaluation system for data analysis, wherein the set of raw data comprises the image data;
    analyzing, by the data acquisition and evaluation system, the raw data corresponding to the real-time images taken under different lights to determine one or more material properties of the object, wherein the analyzing includes, for each wavelength range emitted by the at least one radiation source and each image,
        detecting one or more profiles or contoured areas and generating a corresponding raw data set;
        using the corresponding raw data set to search a storage device for a data set that matches the corresponding raw data set to a preset degree, wherein the storage device stores a multitude of data sets related to sample images obtained under different lighting conditions and including material properties comprising a crack-like shape, a plant-like shape, a plant root-like shape, a stain-like shape, a chipped-off shape and a depth profile; and
        outputting for each wavelength range an indication of the one or more material properties of the object in response to a match,
    outputting the one or more material properties to at least one of a storage device and a display in response to the indications outputted for each wavelength range being indicative of the same one or more material properties.

2. The method according to claim 1, further comprising:
    determining, by the data acquisition and evaluation system, a classification of the one or more material properties of the object, according to the determined one or more material properties of the object, wherein the classification includes at least one class for at least one of the crack-like shape, the plant-like shape, the plant root-like shape, the stain-like shape, the chipped-off shape and the depth profile.

3. The method according to claim 2, further comprising:
    determining, by the data acquisition and evaluation system, whether the one or more material properties are indicative of a damage of the object, based on the classification of the material and the determined one or more material properties of the object.

4. The method according to claim 3, further comprising:
    labelling, by the AI model, the set of raw data provided to the data acquisition and evaluation system to generate labelled data, the labelled data determining the classification of the one or more material properties of the object, wherein the labelled data is indicative of at least one of the crack-like shape, the root-like shape, the stain-like shape, the chipped-off shape, and the depth profile.

5. The method according to claim 2, further comprising:
    labelling, by the AI model, the set of raw data provided to the data acquisition and evaluation system to generate labelled data, the labelled data determining the classification of the one or more material properties of the object, wherein the labelled data is indicative of at least one of the crack-like shape, the root-like shape, the stain-like shape, the chipped-off shape, and the depth profile.

6. The method according to claim 5, wherein the labelling is performed according to a set of AI rules used by the AI model for determining the one or more material properties of the object.

7. The method according to claim 6, wherein initially the set of AI rules are preset based on an existing collection of data concerning material classification and material properties.

8. The method according to claim 5, wherein initially the set of AI rules are preset based on an existing collection of data concerning material classification and material properties.

9. The method according to claim 8, further comprising updating the AI model using the generated labelled data.

10. The method according to claim 9, further comprising selecting, by the data acquisition and evaluation system, a subset of the labelled data and using the selected subset of labelled data for retraining the AI model.

11. The method according to claim 9, further comprising retraining the AI model using further labelled data.

12. The method according to claim 8, further comprising retraining the AI model using further labelled data.

13. The method according to claim 12, wherein retraining the AI model comprises using a modified set of AI rules according to the labelled data.

14. The method according to claim 12, further comprising selecting, by the data acquisition and evaluation system, a subset of the labelled data and using the selected subset of labelled data for retraining the AI model.

15. The method according to 2, further comprising:
    obtaining 3D-characteristic data of the one or more material properties of the object; and
    including the obtained 3D-characteristic data in the set of raw data for data analysis by the data acquisition and evaluation system;

wherein determining the one or more properties of the one or more material properties of the object is further based on the obtained 3D-characteristic data.

16. The method according to claim 2, further comprising:
obtaining one or more metadata of the one or more material properties of the object; and
including the obtained one or more metadata in the set of raw data for data analysis by the data acquisition and evaluation system; wherein determining the one or more material properties of the object is further based on the one or more metadata obtained.

17. The method according to claim 1, further comprising:
obtaining 3D-characteristic data of the one or more material properties of the object; and
including the obtained 3D-characteristic data in the set of raw data for data analysis by the data acquisition and evaluation system;
wherein determining the one or more properties of the one or more material properties of the object is further based on the obtained 3D-characteristic data.

18. The method according to claim 17, wherein obtaining the 3D-characteristic data of the one or more material properties of the object comprises detecting, by one or more detectors, 3D-characteristic of the one or more material properties of the object to obtain the 3D-characteristic data.

19. The method according to claim 1, further comprising:
obtaining one or more metadata of the one or more material properties of the object; and
including the obtained one or more metadata in the set of raw data for data analysis by the data acquisition and evaluation system; wherein determining the one or more material properties of the object is further based on the one or more metadata obtained.

20. A system for determining one or more material properties of an object, comprising:
a data acquisition and evaluation system comprising an Artificial Intelligence model engine and a central control unit;
at least one radiation source adapted to emit radiation of different wavelength ranges in a temporal sequence, one wavelength range at a time, to be projected onto the object, wherein the different wavelength ranges of radiation and the temporal sequence are pre-set by the Artificial Intelligence (AI) model engine of the data acquisition and evaluation system, wherein the at least one radiation source is configured to emit ultraviolet (UV) light, infrared (IR) light and visible light;
at least one multi-spectral image acquisition device adapted to capture radiation reflected by the object and to generate multiple images, and corresponding image data, according to the reflected radiation of multiple wavelength ranges, respectively, wherein the at least one multi-spectral image acquisition device is configured to generate a first real-time image under UV light in response to the radiation source emitting UV light, a second real-time image under IR light in response to the radiation source emitting IR light, and a third real-time image under visible light in response to the radiation source emitting visible light;
a storage device; and
a display;
wherein the central control unit is coupled to the at least one radiation source and the at least one multi-spectral image acquisition device, the central control unit controlling the at least one radiation source according the pre-set temporal sequence, and synchronizing the at least one multi-spectral image acquisition device, and
wherein the data acquisition and evaluation system is configured to analyze raw data corresponding to the real-time images taken under different lights to determine one or more material properties of the object and to output the one or more material properties to at least one of the storage device and the display,
wherein, for analyzing the raw data, the data acquisition and evaluation system is configured, for each wavelength range emitted by the at least one radiation source and each image,
to detect one or more profiles or contoured areas and to generate a corresponding raw data set;
to use the corresponding raw data set to search the storage device for a data set that matches the corresponding raw data set to a preset degree, wherein the storage device stores a multitude of data sets related to sample images obtained under different lighting conditions and including material properties comprising a crack-like shape, a plant-like shape, a plant root-like shape, a stain-like shape, a chipped-off shape and a depth profile; and
output for each wavelength range an indication of the one or more material properties of the object in response to a match,
wherein the data acquisition and evaluation system is configured to output the one or more material properties to at least one of the storage device and the display in response to the indications outputted for each wavelength range being indicative of the same one or more material properties.

\* \* \* \* \*